United States Patent
Fallis, III et al.

(10) Patent No.: US 8,287,029 B2
(45) Date of Patent: Oct. 16, 2012

(54) RETRACTABLE HARDTOP WITH REAR PIVOT DECKLID AND SECTIONS THAT SEPARATE AND STACK FOR STORAGE

(75) Inventors: Robert E. Fallis, III, Rochester, MI (US); Michael T. Willard, Harrison Township, MI (US); Robert D. Wiechowski, Warren, MI (US)

(73) Assignee: Magna Car Top Systems GmbH, Troy, MI (US)

( * ) Notice: Subject to any disclaimer, the term of this patent is extended or adjusted under 35 U.S.C. 154(b) by 232 days.

(21) Appl. No.: 12/784,931

(22) Filed: May 21, 2010

(65) Prior Publication Data
US 2010/0301629 A1 Dec. 2, 2010

Related U.S. Application Data

(60) Provisional application No. 61/181,808, filed on May 28, 2009.

(51) Int. Cl.
*B60J 7/14* (2006.01)
(52) U.S. Cl. .................. 296/108; 296/107.08
(58) Field of Classification Search .......... 296/108, 296/107.08
See application file for complete search history.

(56) References Cited

U.S. PATENT DOCUMENTS

| | | | |
|---|---|---|---|
| 3,059,962 A | 10/1962 | Harms et al. | |
| 6,053,560 A | 4/2000 | Rothe | |
| 6,312,042 B1 | 11/2001 | Halbweiss et al. | |
| 6,729,672 B2 | 5/2004 | Neubrand | |
| 7,240,952 B2 | 7/2007 | Gandemer et al. | |
| 7,677,635 B2 * | 3/2010 | Brockhoff | 296/108 |
| 2002/0003355 A1 | 1/2002 | Mac Farland | |
| 2002/0030381 A1 * | 3/2002 | Schutt et al. | 296/108 |
| 2002/0036413 A1 | 3/2002 | Neubrand et al. | |
| 2007/0187985 A1 * | 8/2007 | Mori | 296/108 |

* cited by examiner

*Primary Examiner* — Dennis Pedder
(74) *Attorney, Agent, or Firm* — Brooks Kushman P.C.

(57) ABSTRACT

A retractable hardtop for a vehicle including a front panel and an intermediate panel disposed behind the front panel in an extended position. A back panel supports a back light and is disposed below and rearwardly adjacent to the intermediate panel in the extended position. A pair of sail panels are disposed below the intermediate panel and engage opposite lateral sides of the back panel in the extended position but are separated from the back panel in the retracted position. A linkage connects the front panel, intermediate panel, and back panel to the vehicle. The front panel is shifted by the linkage over the intermediate panel and the back panel is shifted below the intermediate panel as the retractable hardtop is moved from the extended position toward a retracted position. A method of retracting a retractable hardtop as described above is also disclosed.

12 Claims, 4 Drawing Sheets

RETRACTABLE HARDTOP WITH REAR PIVOT DECKLID AND SECTIONS THAT SEPARATE AND STACK FOR STORAGE

CROSS-REFERENCE TO RELATED APPLICATIONS

This application claims the benefit of U.S. provisional Application No. 61/181,808 filed May 28, 2009. The disclosure of which is incorporated in its entirety by reference herein.

BACKGROUND OF THE INVENTION

1. Field of the Invention

The present invention relates to a retractable hardtop for a vehicle.

2. Background Art

A convertible top may be provided as a retractable hardtop that includes rigid retractable panels. Alternatively, a soft top convertible may be provided that includes a fabric cover over a plurality of bows. Soft top convertibles generally require less space than retractable hardtops because the fabric cover may be folded or compressed when the top is retracted thereby minimizing storage requirements. Retractable hardtops are favored by some consumers because they offer the appearance of a hardtop vehicle and may be perceived to be more durable.

One disadvantage of prior art retractable hardtops is that space limitations imposed by vehicle design make it difficult to store rigid panels in the vehicle when retracted. There is a need to reduce the space required in the trunk of a vehicle to store the retractable hardtop when retracted. There is also a need to provide clearance for the retractable hardtop top stack linkage as it is moved through the retraction and extension cycles.

The present invention is directed to solving the problems by providing a simple and effective retractable hardtop that minimizes the space required in the trunk of the vehicle to store the retractable hardtop when it is retracted.

SUMMARY

According to one aspect of the disclosure, a retractable hardtop for a vehicle is provided that comprises a front panel, an intermediate panel disposed behind and immediately adjacent the front panel in an extended position. A back panel supports and surrounds a back light and is disposed below and rearwardly adjacent to the intermediate panel in the extended position. A pair of sail panels are disposed below the intermediate panel and engage opposite lateral sides of the back panel in the extended position. A linkage connects the front panel, intermediate panel, and back panel to the vehicle. The front panel is shifted by the linkage over the intermediate panel and the back panel is shifted below the intermediate panel as the retractable hardtop is moved from the extended position toward a retracted position.

According to other aspects of the disclosure, the sail panels may be separated from the back panel as the retractable hardtop is retracted. The back panel may be disposed completely beneath the intermediate panel when retractable hardtop is in the retracted position and is stowed in the storage compartment In addition, the front panel and the intermediate panel each have a top surface that remain facing upwardly when in an extended position as the retractable hardtop is retracted and when the retractable hard top is in the retracted position and is stowed in the storage compartment. The front panel may be used to form a tonneau over the intermediate panel in conjunction with a decklid when the hardtop is in the retracted position.

According to the disclosure as it relates to the linkage, a front panel four bar link may be provided between the front panel and the intermediate panel that shifts the front panel relative to the intermediate panel during the retraction and extension cycle. A back panel four bar link may connect the back panel to an intermediate panel four bar link, wherein the intermediate panel four bar link connects the intermediate panel to the vehicle and the back panel four bar link shifts the back panel relative to the intermediate panel during the retraction and extension cycle.

Another aspect of the disclosure relates to a method of retracting a retractable hardtop. The retractable hardtop includes a front panel having an upwardly facing top surface and an intermediate panel having an upwardly facing top surface. The intermediate panel is disposed behind and immediately adjacent the front panel in an extended position. A back panel supports and surrounds a back light and is disposed below and rearwardly adjacent to the intermediate panel in the extended position. A pair of sail panels are disposed below the intermediate panel that engage opposite lateral sides of the back panel in the extended position. A linkage connects the front panel, intermediate panel, and back panel to the vehicle. The method comprises the steps of lifting the front section over the intermediate section with the linkage. Separating the sail panels from the back panel with the linkage. Drawing the back panel under the intermediate panel. The front panel, the intermediate panel and back panel are then lowered into the storage compartment with the front panel and intermediate panel remaining in the same upwardly facing orientation through out the retraction cycle.

According to other aspects of the method, the linkage may include a front four bar link that connects the front panel to the intermediate panel and the method may further comprise shifting the front panel to a position above the intermediate panel with the front linkage during the retraction cycle. The linkage may also include a back panel four bar link that connects the back panel to an intermediate panel four bar link. The intermediate panel four bar link may connect the intermediate panel to the vehicle and the method may further comprise shifting the back panel below the intermediate panel during the retraction cycle.

These and other aspects of the disclosure will be better understood in view of the attached drawings and the following detailed description of the illustrated embodiments.

DETAILED DESCRIPTION OF THE PREFERRED EMBODIMENT(S)

Figure 1:
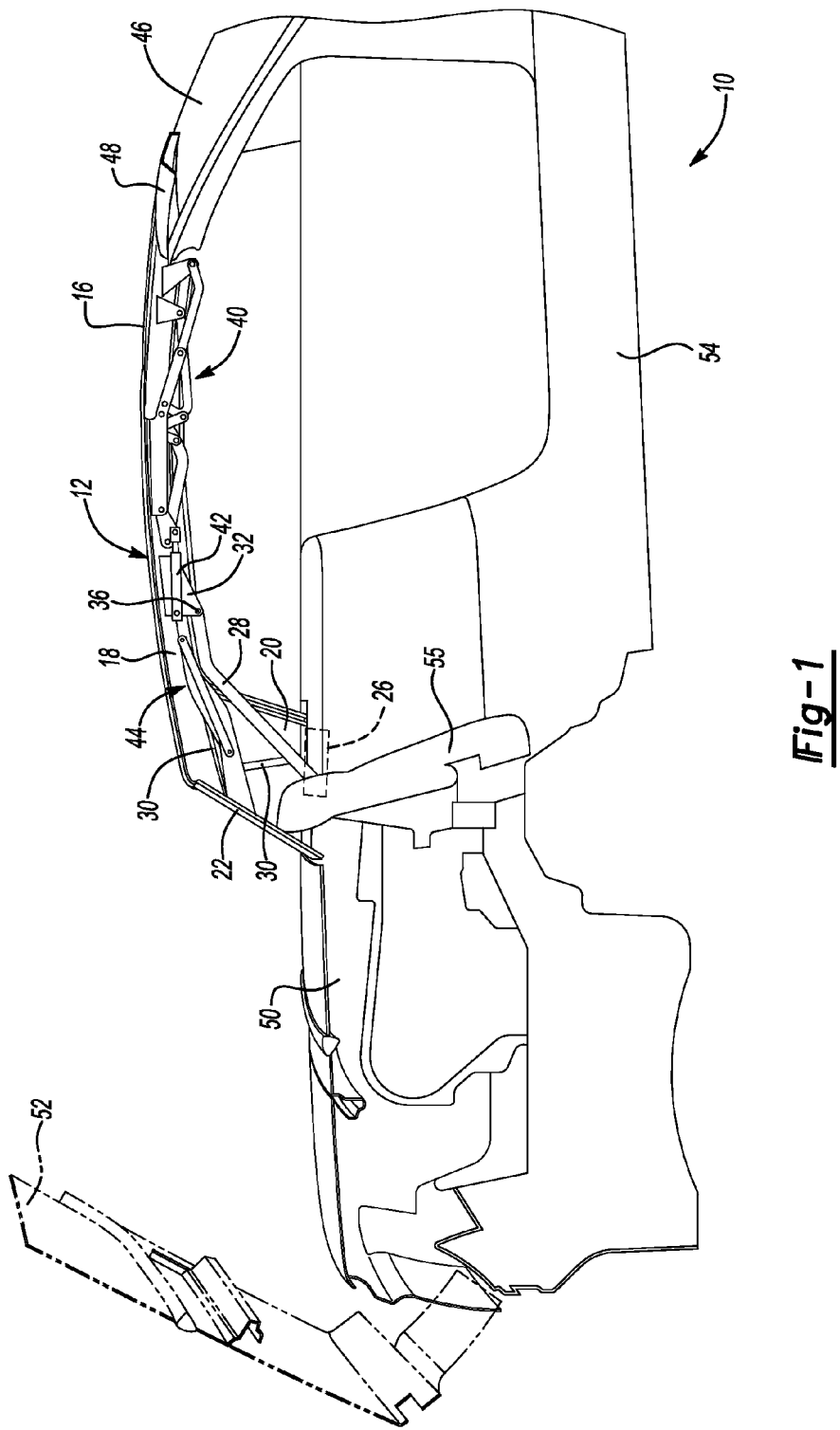
FIG. 1 is a fragmentary diagrammatic side elevation view taken from the inside of the vehicle of one side of the retractable hardtop made according to the present invention in a fully extended position.

Referring to FIG. 1, a vehicle 10 having a retractable hardtop generally indicated by reference numeral 12 is illustrated in a fragmentary view. In FIG. 1, the retractable hardtop 12 is shown in its fully extended position.

The retractable hardtop 12 includes a front panel 16. An intermediate panel 18 is disposed immediately adjacent and behind the front panel 16. The front panel 16 is contiguous with and disposed immediately in front of the intermediate panel 18. During the retraction cycle, the front panel 16 is moved to a position overlying the intermediate panel as will be described below.

Figure 2:
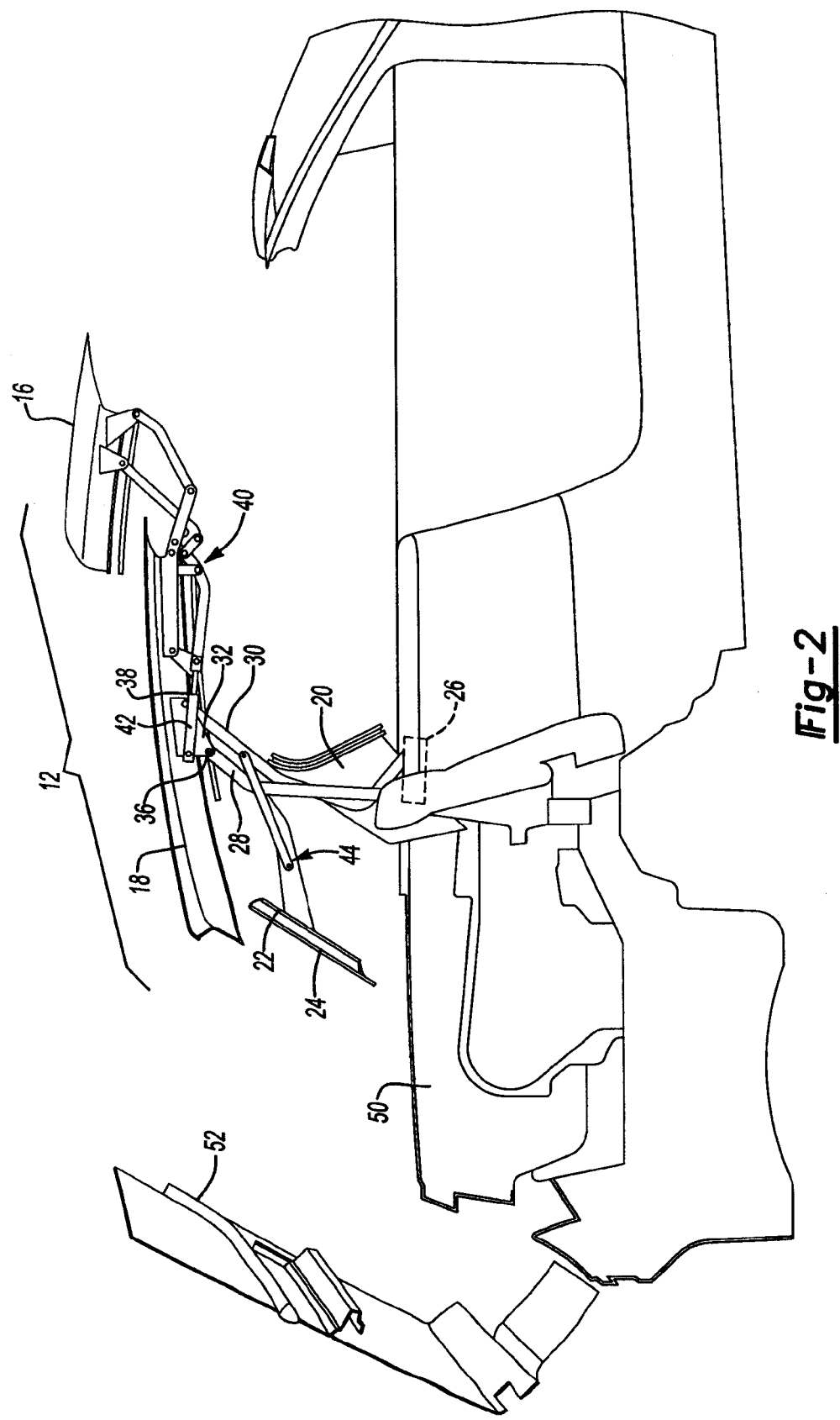
FIG. 2 is a fragmentary diagrammatic side elevation view in the initial retraction position taken from the inside of the vehicle of one side of the retractable hardtop made according to the present invention in an early retraction position.

A sail panel 20 is disposed below a rear portion of the intermediate panel 18. A back panel 22 supports and surrounds the back light 24. The sail panel 20 engages the back panel 22 on the right and left sides of the intermediate panel 18. The back panel 22 extends between the rear edge of the intermediate panel 18 and the belt line of the vehicle 10. A main pivot bracket 26 secures the retractable hardtop 12 to the vehicle 10. A balance link 28 and a rear link 30 interconnect the main pivot bracket 26 with the intermediate panel 18. A flange 32 is attached at a generally central location on the intermediate panel 18. Both the balance link 28 and the rear link 30 are pivotally connected to the flange 32. The balance link 28 is connected to a pivot connector 36 on the flange 32. The rear link 30 is connected to a pivot connector 38, which is not visible in FIG. 1, but is shown in FIG. 2.

A front four bar linkage is generally identified by reference numeral 40 which attaches the front panel 16 to the intermediate panel 18. A power cylinder 42 comprises a hydraulic cylinder that is connected to the flange 32 and the front four bar linkage 40. The power cylinder 42 is extended and retracted to actuate the front four bar linkage 40.

A back light four bar linkage is generally indicated by reference numeral 44. The back four bar linkage 44 connects the back panel 22 and back light 24 to the balance link 28 and rear link 30. The back light four bar linkage 44 separates the back panel 22 from the intermediate panel 18 and the sail panel 20 during the retraction cycle. The back panel 22 is shifted to a position below the rear portion of the intermediate panel 18 when stored as will be described with reference to FIG. 4 below.

With continued reference to FIG. 1, a windshield 46 is shown to include a header 48. When retractable hardtop 12 is in its extended position, the retractable hardtop 12 is secured by a clamping mechanism to header 48. The front panel 16 forms a smooth and continuous upper surface with the header 48 and the intermediate panel 18.

A storage compartment 50 is covered by a decklid 52 when the decklid 52 is closed, as shown in solid lines in FIG. 1. The decklid 52 is a rear pivoting decklid 52, as shown in phantom lines in FIG. 1. The storage compartment 50 is disposed rearward of the passenger compartment 54 and immediately behind the rear seat 55.

The sail panel 20 separates from the back panel 22 and the intermediate panel 18 as the retractable hardtop 12 is retracted and when in the stored position. The sail panel 20 is pivotally connected to the main pivot bracket 26 and pivots with bar 30 within a sidewall 58 of the vehicle 10. The sidewall 58 is located behind the door 60. The sidewall 58 extends upwardly to the belt line 62. The sail panel 20 fills the area between the belt line 62 and the intermediate panel 18 and also extends in front of the back panel 22 in the closed (extended) position of the hard top 12.

Referring to FIG. 2, the retractable hardtop 12 is shown in an early retraction position. The retractable hardtop 12 begins retraction by actuating a power cylinder (not shown) that may be connected to either the balance link 28 or the rear link 30. The balance link 28 and rear link 30 lift the intermediate panel 18 upwardly and shift it rearwardly on the intermediate four bar link created by the main pivot bracket 26, the flange 32, the balance link 28 and the rear link 30. At the same time, the front panel 16 is moved by the front four bar linkage 40 to a position above the front edge of the intermediate panel 18 by actuating the power cylinder 42. Also, at the same time, the movement of the balance link 28 and the rear link 30 cause the back light four bar linkage 44 to separate the back panel 22 and its associated back light 24 from the sail panel 20. The sail panel 20 is connected to the rear link 30 and pivots with the rear link 30 in a counter-clockwise direction about a transverse axis, as shown in FIG. 2, causing the sail panel 20 to move rearwardly toward the storage compartment 50. The decklid 52 is shifted to its open position by pivoting on a hinge (not shown) on its rear edge.

Figure 3:
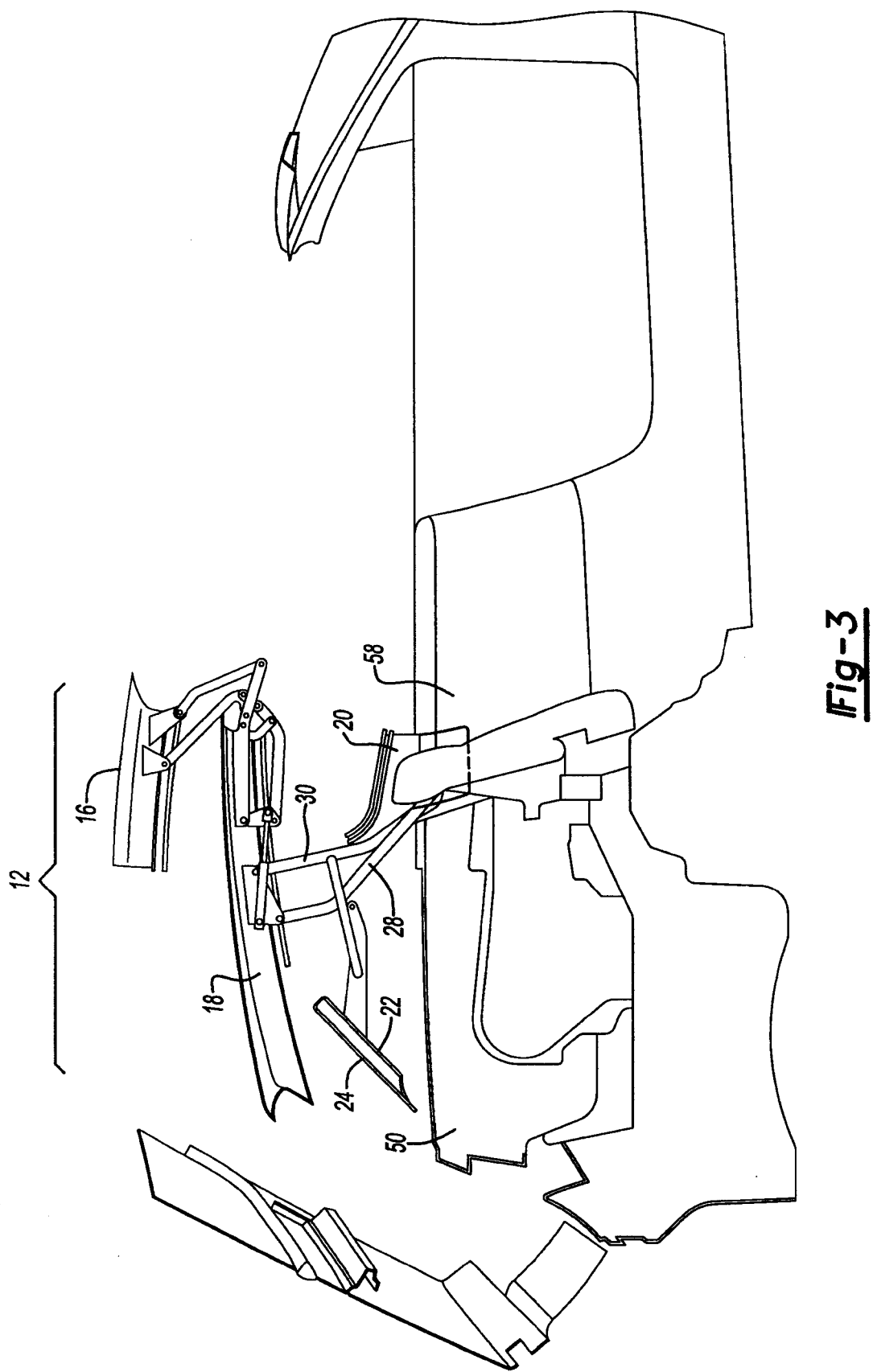
FIG. 3 is a fragmentary diagrammatic side elevation view in the mid-retraction position taken from the inside of the vehicle of one side of the retractable hardtop made according to the present invention in a mid-retraction position.

Referring to FIG. 3, the retractable hardtop 12 is shown in a late retraction position in which it is generally disposed above the storage compartment 50. In this position, the front panel 16 is disposed almost completely over the intermediate panel 18 and the intermediate panel 18 is shifted rearwardly and is located almost wholly over the storage compartment 50. The sail panel 20 is rotated in a counter-clockwise direction with the rear link 30 and is partially disposed within the sidewall 58. The back panel 22 and back light 24 are rotated by the balance link 28 and rear link 30 to a position generally below the rear portion of the intermediate panel 18 and directly above the storage compartment 50.

Figure 4:
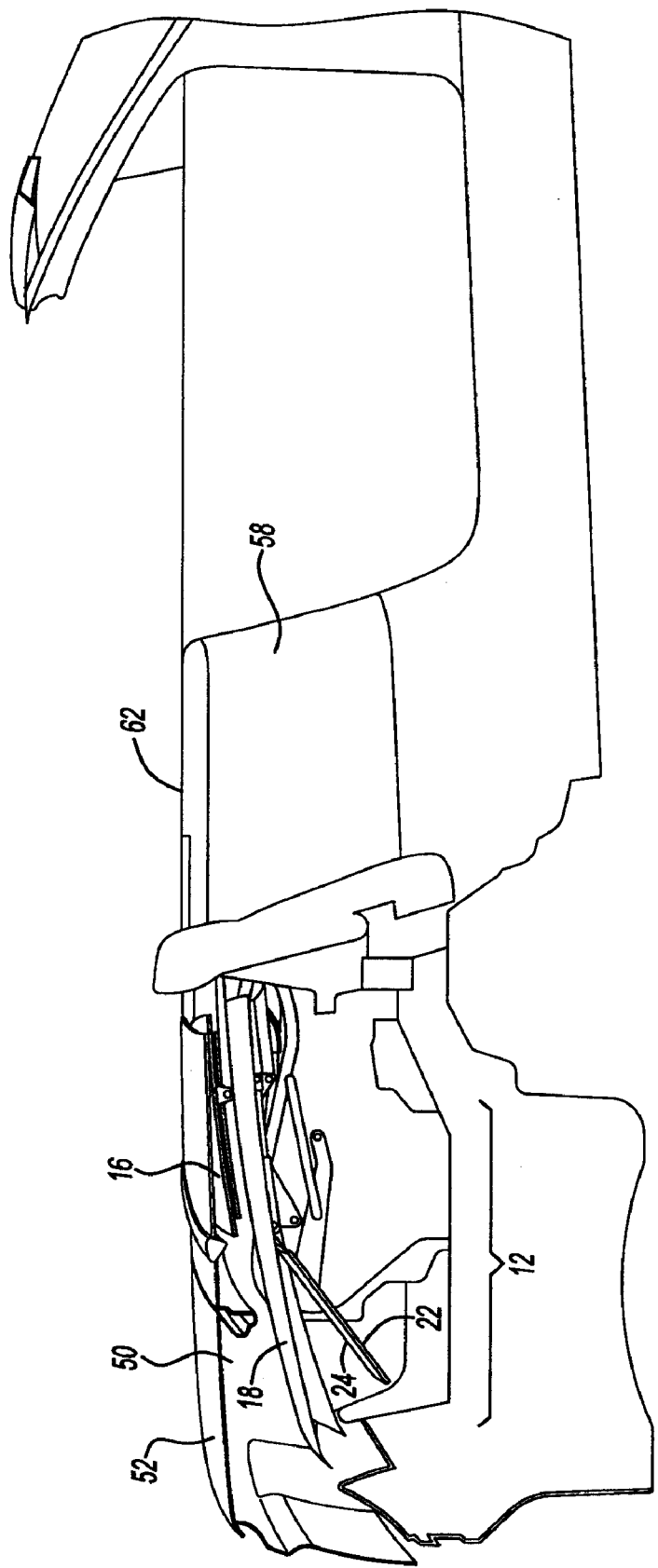
FIG. 4 is a fragmentary diagrammatic side elevation view in the fully retracted position taken from the inside of the vehicle of one side of the retractable hardtop made according to the present invention in the fully retracted position.

Referring to FIG. 4, the retractable hardtop 12 is shown in its stored position in the storage compartment 50 and below the decklid 52. The front panel 16 is located between the front portion of the intermediate panel 18 and the decklid 52. The intermediate panel 18 is stacked in a "onion skin" arrangement relative to the front panel 16. Both the front panel 16 and the intermediate panel 18 are disposed in a generally horizontal orientation relative to the vehicle, as shown in FIG. 4. The back panel 22 and the back light 24 that is carried by the back panel 22 is located within the storage compartment 50 immediately below the rear portion of the intermediate panel 18. The sail panel 20 (not shown in FIG. 4) is located below the belt line 62 within the sidewall 58. The decklid 52 is closed, as shown in FIG. 4, to close the storage compartment 50.

The extension cycle taking the retractable hardtop 12 from the stored position shown in FIG. 4 back to the extended position shown in FIG. 1, merely requires reversing the movement of the panels and links as described above.

While the operation of the retractable hardtop 12 has been described with reference to the linkage provided on the left side of the vehicle, it should be understood that a mirror image linkage is provided on the right side of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:
1. A retractable hardtop for a vehicle comprising:
a front panel;

an intermediate panel disposed behind and immediately adjacent the front panel in an extended position;

a back panel that supports and surrounds a back light and is disposed below and rearwardly adjacent to the intermediate panel in the extended position;

a pair of sail panels disposed below the intermediate panel and that engage opposite lateral sides of the back panel in the extended position a linkage connecting the front panel, intermediate panel, and back panel to the vehicle; and wherein the front panel is shifted by the linkage over the intermediate panel, the back panel is shifted below the intermediate panel, and the sail panels pivot about a transverse axis as the retractable hardtop panels are retracted from the extended position and moved rearwardly toward a retracted position.

2. The retractable hardtop of claim 1 wherein the sail panels are separated from the back panel as the retractable hardtop is retracted.

3. The retractable hardtop of claim 1 wherein the front panel and the intermediate panel each have a top surface that remain facing upwardly when in an extended position, as the retractable hardtop is retracted and when the retractable hard top is in the retracted position and is stowed in the storage compartment.

4. The retractable hardtop of claim 1 wherein the front panel forms a tonneau over the intermediate panel in conjunction with a decklid when the hardtop is in the retracted position.

5. The retractable hardtop of claim 1 wherein the back panel is disposed completely beneath the intermediate panel when retractable hardtop is in the retracted position and is stowed in the storage compartment.

6. The retractable hardtop of claim 1 wherein a front panel four bar link is provided between the front panel and the intermediate panel that shifts the front panel relative to the intermediate panel during the retraction and extension cycle.

7. The retractable hardtop of claim 1 wherein a back panel four bar link connects the back panel to an intermediate panel four bar link, wherein the intermediate panel four bar link connects the intermediate panel to the vehicle and the back panel four bar link shifts the back panel relative to the intermediate panel during the retraction and extension cycle.

8. A method of retracting a retractable hardtop that includes a front panel having an upwardly facing top surface, an intermediate panel having an upwardly facing top surface upwardly facing top surfaces of the disposed behind and immediately adjacent the front panel in an extended position, a back panel that supports and surrounds a back light and is disposed below and rearwardly adjacent to the intermediate panel in the extended position, a pair of sail panels disposed below the intermediate panel and that engage opposite lateral sides of the back panel in the extended position, and a linkage connecting the front panel, intermediate panel, and back panel to the vehicle, wherein the method comprises:

lifting the front section over the intermediate section with the linkage;

separating the sail panels from the back panel with the linkage;

drawing the back panel under the intermediate panel; and lowering the front panel, the intermediate panel and back panel into the storage compartment with the front panel and intermediate panel remaining in the same upwardly facing orientation through out the retraction cycle.

9. The method of claim 8 wherein the linkage includes a front four bar link that connects the front panel to the intermediate panel and the method further comprises shifting the front panel to a position above the intermediate panel with the front linkage during the retraction cycle.

10. The method of claim 8 wherein the linkage includes a back panel four bar link connects the back panel to an intermediate panel four bar link, wherein the intermediate panel four bar link connects the intermediate panel to the vehicle and wherein the method further comprises shifting the back panel below the intermediate panel during the retraction cycle.

11. A retractable hardtop for a vehicle comprising:

a front panel;

an intermediate panel disposed behind and immediately adjacent the front panel in an extended position;

a back panel that supports and surrounds a back light and is disposed below and rearwardly adjacent to the intermediate panel in the extended position;

a pair of sail panels disposed below the intermediate panel and that engage opposite lateral sides of the back panel in the extended position a linkage connecting the front panel, intermediate panel, and back panel to the vehicle; and wherein the front panel is shifted by the linkage over the intermediate panel and the sail panels are separated from the back panel as the retractable hardtop is retracted from the extended position and is moved toward a retracted position.

12. The retractable hardtop of claim 11 wherein a back panel four bar link connects the back panel to an intermediate panel four bar link, wherein the intermediate panel four bar link connects the intermediate panel to the vehicle and the back panel four bar link shifts the back panel relative to the intermediate panel during the retraction and extension cycle.

* * * * *